US006873732B2

(12) United States Patent
Dance

(10) Patent No.: US 6,873,732 B2
(45) Date of Patent: Mar. 29, 2005

(54) METHOD AND APPARATUS FOR RESOLVING PERSPECTIVE DISTORTION IN A DOCUMENT IMAGE AND FOR CALCULATING LINE SUMS IN IMAGES

(75) Inventor: Christopher R. Dance, Trumpington (GB)

(73) Assignee: Xerox Corporation, Stamford, CT (US)

( * ) Notice: Subject to any disclaimer, the term of this patent is extended or adjusted under 35 U.S.C. 154(b) by 681 days.

(21) Appl. No.: 09/901,508

(22) Filed: Jul. 9, 2001

(65) Prior Publication Data

US 2003/0026482 A1 Feb. 6, 2003

(51) Int. Cl.[7] .............................................. G06T 15/20
(52) U.S. Cl. ...................................... 382/199; 382/275
(58) Field of Search ................................ 382/199, 275, 382/293, 281, 202

(56) References Cited

U.S. PATENT DOCUMENTS

| | | | | |
|---|---|---|---|---|
| 5,285,504 A | * | 2/1994 | Pavlidis et al. | 382/176 |
| 5,355,420 A | | 10/1994 | Bloomberg et al. | 382/46 |
| 5,638,116 A | * | 6/1997 | Shimoura et al. | 348/118 |
| 5,651,075 A | * | 7/1997 | Frazier et al. | 382/105 |
| 5,832,110 A | * | 11/1998 | Hull | 382/168 |
| 6,304,313 B1 | * | 10/2001 | Honma | 355/18 |
| 6,400,848 B1 | * | 6/2002 | Gallagher | 382/254 |
| 6,473,517 B1 | * | 10/2002 | Tyan et al. | 382/105 |
| 6,778,699 B1 | * | 8/2004 | Gallagher | 382/165 |

FOREIGN PATENT DOCUMENTS

GB    2 305 050 A    3/1997

OTHER PUBLICATIONS

Palmer et al. "Accurate Line Parameters from an Optimising Hough Transform for Vanishing Point Detection." Proc. 4th Int. Conf. on Computer Vision, May 11, 1993, pp. 529–533.*
McLean et al. "Vanishing Point Detection by Line Clustering." IEEE Trans. on Pattern Analysis and Machine Intelligence, vol. 17, No. 11, Nov. 1995, pp. 1090–1095.*
Gamba et al. "Vanishing Point Detection by Voting Scheme." Proc. Int. Conf. on Image Processing, vol.2, Sep. 16, 1996, pp. 301–304.*
Tuytelaars et al. "The Cascaded Hough Transform." Proc. Int. Conf. on Image Processing, vol.2, Oct. 26, 1997, pp. 736–739.*
Lutton et al. "Contribution to the Determination of Vanishing Points Using Hough Transform." IEEE Trans. on Pattern Analysis and Machine Intelligence, vol.16, No. 4, Apr. 1994, pp. 430–438.*

(List continued on next page.)

Primary Examiner—Jon Chang
(74) Attorney, Agent, or Firm—Oliff & Berridge, PLC

(57) ABSTRACT

Perspective distortion is estimated in a digital document image by detecting perspective pencils in two directions, one being parallel to text lines, and the other being parallel to the boundaries of formatted text columns. The pencils are detected by analyzing directional statistical characteristics of the image. To detect a pencil, a first statistical line transform is applied to transform the image into line space, and a second statistical score transform is applied to transform the image into pencil space. A dominant peak in pencil space identifies the perspective pencil. In addition, a computationally efficient line summing technique is used for effecting sums of pixels along inclined target lines (or curves) through an image. The technique includes pre-generating partial sums, and summing along step segments of a target line using the partial sums.

28 Claims, 13 Drawing Sheets

OTHER PUBLICATIONS

New Release on Pixid Inc.'s Whiteboard Photo product, Apr. 2000, available on the Internet at http://www.thejournal.com/magazine/vault/A2816.cfm.

S. T. Barnard, "Interpreting perspective images", Artificial Intelligence, 21:435–462, 1983.

Bloomberg, D.S., Kopec, G.E., and Dasari, L., "Measuring document image skew and orientation", in SPIE Conference on Document Recognition II, vol. 2422, pp. 302–315, Feb. 1995.

P. Clark and M. Mirmehdi, "Location and recovery of text on oriented surfaces", In Proc. SPIE: Document Recognition and Retrieval VII, pp. 267–277, 2000.

K. Ikeuchi, "Shape from regular patterns", Artificial Intelligence, 22:49–75, 1984.

K. Kanatani and T. Chou, "Shape from texture: general principle", Artificial Intelligence, 38:1–48, 1989.

W. Postl, "Detection of linear oblique structures and skew scan in digitized documents", In Proc. $8^{th}$ International Conference on Pattern Recognition, pp. 687–689, 1986.

E. Ribero and E. Hancock, "Improved orientation estimation from texture planes using multiple vanishing points", Pattern Recognition, 33:1599–1610, 2000.

J. Shufelt, "Performance evaluation and analysis of vanishing point detection techniques", IEEE Trans. Pattern Analysis and machine intelligence, 21(3):282–288, 1999.

B. Super and A. Bovik, "Planar surface orientation from texture spatial frequencies", Pattern Recognition 28(5): 729–743, 1995.

XP–002264506; P. Clark et al; "Location and Recovery of Text on Oriented Surfaces"; Jan. 2000; SPIE vol. 3967; pp 267–277.

XP–002264500; T. Tuytelaars et al; "The Cascaded Hough Transform as an Aid in Aerial Image Interpretation"; pp 67–72.

XP–002264501; Christopher R. Dance; "Perspective Estimation for Document Images"; Xerox Res. Ctr. Europe; pp 244–254.

XP–0022645202; A. Amin et al; "A Document Skew Detection Method Using the Hough Transform"; School of Computer Science & Eng.; Univ. of New South Wales; Oct. 20, 1999; pp 243–253.

XP–000610275; Martin L. Brady et al; "Fast Parallel Discrete Approximation Algorithms for the Radon Transform"; Dept. of Elec. and Computer Eng., The Penn State University; 1992; pp 91–99.

XP–002277760; Steve Hodges et al.; "Faster Spatial Image Processing Using Partial Summation"; Jan. 1996; pp 1–40.

* cited by examiner

METHOD AND APPARATUS FOR RESOLVING PERSPECTIVE DISTORTION IN A DOCUMENT IMAGE AND FOR CALCULATING LINE SUMS IN IMAGES

BACKGROUND TO THE INVENTION

1. Field of the Invention

The present invention relates to processing digital pixel images.

In one aspect, the invention relates to processing an image of a document and, in particular to resolving perspective distortion in the image. The invention is especially suitable for processing an image of a document captured using a digital camera, but the invention is not limited exclusively to this.

In another aspect, the invention relates to performing a summing function along lines through the image. This technique may advantageously be used in the first aspect of the invention, but may find application in any image processing requiring a line sum along a line inclined relative to the image coordinate axes (for example, skew detection).

2. Description of Related Art

There has been increasing interest in capturing a digital image of a document using a digital camera. A camera can be more convenient to use than a traditional device such as a flatbed scanner. For example, a camera may be portable, and offer the convenience of face-up, near instantaneous image acquisition. However, this freedom of use for cameras means that the document is captured under less constrained conditions than when using a scanner designed for high quality document imaging. For example, when using a scanner, the document is typically scanned at a predetermined fixed position and under controlled conditions. In contrast, when using a camera, the camera may be at any arbitrary position relative to the document. This can lead to degradation of the captured image, in particular degradation caused by perspective distortion in the captured image.

By way of illustration, FIGS. 1 and 2 provide a comparison of images of a document 10 captured using a flatbed scanner (FIG. 1) and using a digital camera (FIG. 2). In either figure, part (a) shows the original document 10 and part (b) shows the captured image 12. Part (c) shows the appearance of the word "the" at two different positions 14 and 16 in the captured image.

In FIG. 1(b), the document image 12 captured by the scanner may be slightly skewed (in a worst case situation if the user did not place the document on the scanner correctly), but the document is "flat" in the image. Any skew in the image is uniform, and does not vary. Such uniform skew can be resolved and corrected using any well known skew detection algorithm, such as that described in U.S. Pat. No. 5,335,420. Other suitable skew detection techniques are described in W. Posti, "Detection of linear oblique structures and skew scan in digitized documents", In Proc. 8$^{th}$ International Conference on Pattern Recognition, pages 687–689, 1986; and D. Bloomberg, G. Kopec and L. Dasari, "Measuring document image skew and orientation", In Proc. SPIE: Document Recognition II, pages 302–316, 1995.

In FIG. 2(b), the image 12 suffers from perspective distortion which is caused by the camera being used at a slight angle offset from the optimum axis normal to the document plane. Such mis-positioning of the camera relative to the document plane is typical, as a user will often not be able to judge this accurately, or the user will avoid holding the camera in an awkward position. An inexperienced user might not even be aware of the importance of camera position. In FIGS. 2(b) and 2(c), the angles of inclination of the document text are not uniform, but vary across the image. For the first (upper) occurrence 14 of the word "the", the text has a slight downward slant, and each character is twisted clockwise relative to the horizontal. The second (lower) occurrence 16, the text has a slight upward slant and is noticeably larger. Each character is also twisted anticlockwise relative to the horizontal.

It is not possible to apply the usual skew-correction technique to detect and correct for perspective distortion because the skew-correction technique relies on there being a uniform angle of skew across the image. In the case of perspective distortion, the angle changes continuously across the image.

The existence of perspective distortion in an image is highly undesirable. Firstly, the human eye is highly sensitive to such distortion, and it makes the image unappealing and distracting to human readers. Perspective distortion can also create serious problems for automatic image processing techniques which typically assume a "flat" document image without perspective, and may become complicated, slow and even unreliable in the presence of perspective distortions. For instance, template-based text recognition would have to match many more templates to compensate for perspective-induced variations in character shape and orientation. Automatic page layout analysis usually assumes the presence of horizontal and vertical white space, and so might not be effective if perspective distortion is present. Also document image compression schemes may assume a non-perspective image, and might not be optimized for perspective distorted images.

The specific problem of correcting perspective distortion in document images is relatively new and unresolved, since document capture with cameras is itself a new and emerging field. Document images can be described in terms of two orthogonal families of lines: one parallel to the text lines (X-lines) and one parallel to the borders of formatted text columns (Y-lines). The perspective transform of a family of parallel lines is a pencil: that is, a family of lines through a common point, known as a vanishing point. Therefore, under perspective, the lines in the document image are referred to as the X-pencil and the Y-pencil.

Techniques are known for perspective estimation in natural images, and such techniques fall generally into two categories. One approach estimates a texture gradient, whose magnitude describes the slant angle of a textured plane and whose direction describes the tilt direction of the plane. This may be achieved by a segmented analysis of segmented texture primitives (see for example, K. Ikeuchi, "Shape from regular patterns", Artificial Intelligence, 22:49–75, 1984; and K. Kanatani and T. Chou, "Shape from texture: general principle", Artificial Intelligence, 38:1–48, 1989). Alternatively, local frequency domain approaches may be used (see for example, B. Super and A. Bovik, "Planar surface orientation from texture spatial frequencies", Pattern Recognition 28(5): 729–743, 1995).

The second approach attempts to determine vanishing points. Most such techniques employ the Gaussian sphere as accumulator for votes for local edge orientation votes (see for example S. T. Barnard, "Interpreting perspective images", Artificial Intelligence, 21:435–462, 1983; and J. Shufelt, "Performance evaluation and analysis of vanishing point detection techniques", IEEE Trans. Pattern Analysis and machine Intelligence, 21(3):282–288, 1999). More recently, local frequency domain methods for vanishing points have also been proposed (see for example E. Ribero and E. Hancock, "Improved orientation estimation from texture planes using multiple vanishing points", Pattern Recognition, 33:1599–1610, 2000).

However, document images differ significantly from natural images. A natural image contains continuous "hard" edges around the boundary of a defined object in the image, from which perspective information may be obtained. In contrast, an arbitrary document image might typically contain only textual or graphical information with no continuous hard edges (unless all of the edges of the document page happened to be included in the image, and clearly distinguished from a background). Therefore, although document perspective estimation techniques based on hard edges have been proposed (see P. Clark and M. Mirmehdi, "Location and recovery of text on oriented surfaces", In Proc. SPIE: Document Recognition and Retrieval VII, pages 267–277, 2000), such techniques do not perform reliably for general document images.

Accordingly, it would be desirable to provide a technique that can be applied to any generic document image, for estimating the perspective in the image, even if the image does not contain continuous hard edges around the edge of the document page. It would also be desirable for such a technique to be relatively quick in operation (for example, it should be relatively quick compared to operations such as OCR).

SUMMARY OF THE INVENTION

In accordance with the invention, the perspective in a digital document image is estimated by determining at least one pencil that aligns with statistical characteristics present in the document image.

By using statistical characteristics in the image to determine the pencil, the perspective can be estimated based on "soft" features of the image, rather than replying on the presence of detectable "hard" edges in the image.

The statistical characteristics are preferably indicative of text characteristics, such as the direction(s) of lines of text, and/or the direction(s) of the boundaries of a block of text arranged in one or more columns.

In accordance with one aspect of the invention, a first and a second pencils are determined, the first pencil being aligned with statistical characteristics in the image indicative of the directions of lines of text, and the second pencil being aligned with statistical characteristics in the image indicative of the column boundaries of a block of text arranged in one or more columns.

The or each pencil is determined by a method including transforming the image (or a derivation of the image) into a corresponding image in line space, for example, slope-intercept space defined by slope and intercept parameters. A value of a point in the slope-intercept space is calculated by summing along a respective straight line of at least some selected samples in the image.

The method further comprises a score transformation to determine a score for each possible straight line through values in the line space. The score transformation includes a further line space transformation to transform the line space into pencil space. Also, the score transformation includes a step of summing along each possible line in the line space.

In addition, the score transformation includes a non-linear function, the effect of which is to exaggerate larger vales more than small values. For example, such a function might be a square function. The score function includes a minimum threshold, for excluding values below the threshold from contributing to the score.

As described below in detail, the determination of a pencil is based on the principle that, when a perspective transform is applied to any set of parallel lines, there is always some linear relationship between the slopes and intercepts of the lines. This linear relationship can be observed by transforming the lines from x-y space into line space (e.g., slope-intercept space defined by the parameters of slope and intercept, but different parameterizations are also possible). Each straight line in x-y space appears as a single point in slope-intercept line space. A perspective pencil in Cartesian x-y space appears as points aligned in a straight line in such line space.

In the same manner that a straight line in x-y space is transformed into single point in slope-intercept line space, then if a further line space transformation is applied to the slope-intercept space representation of a set S of lines forming a pencil, the points representing these lines in line space will be transformed into a single point in the pencil space. By detecting this point, the original pencil in x-y space can be determined.

Viewed in another aspect of the invention, perspective distortion in a document image is estimated by detecting perspective pencils in two directions, one being parallel to text lines, and the other being parallel to the boundaries of formatted text columns. The pencils are detected by analyzing directional statistical characteristics of the image. To detect a pencil, a first statistical line transform is applied to transform the image into line space, and a second statistical score transform is applied to transform the image into pencil space. A dominant peak in pencil space identifies the perspective pencil.

A further aspect of the invention relates to a curve (e.g., line) summing technique for effecting sums of pixels along curves (e.g., lines of arbitrary slope) though the image. In this aspect of the invention, the technique includes pre-generating partial sums, and summing along step segments of a target curve using the partial sums. Such a technique can be computationally more efficient than slavishly executing a repeated summing function, especially for small angles of slope relative to the coordinate axes.

The further aspect may advantageously be used in the first aspect of the invention, but each aspect may be used in isolation.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. Definitions of Terminology

The terms defined below have the indicated meanings throughout this application, including the claims:

"Line space" is used herein to mean a transform of the space defined by conventional (x, y) co-ordinate axes, into axes representing line parameters. Examples of closely related line space representations include the Hough transform for lines, the Radon transform and sets of projection profiles (defined below).

"Slope-intercept space" is one example of a line space, in which the line space is defined by parameters representing a y intercept "c", and a slope "m". It is useful, since the coordinate axes define straight line parameters y=mx+c.

"Profile" is used herein to mean a transformation including a sum function, using some, or all, sampled points along a straight line.

"Vanishing point" is used herein to mean the intersection point of a set of parallel lines viewed under some perspective.

"Pencil" is used herein to mean (mathematically) a set of lines which pass through a single point. This is useful to define perspective lines which meet at the perspective vanishing point. A pencil Λ is defined by parameters Λ=(α, β), where α is the rate of change of slopes of lines from the pencil with respect to intercept, and β is the slope of the line in the pencil with zero intercept. Thus any line from the pencil can be expressed as:

$$y = mx + c,$$

where $m = \alpha c + \beta$.

"Vote (for a line)" is used herein to mean a statistic extracted from an image which is related to the probability of that line forming a salient structure in the image.

"Score" is used herein to mean a mathematical transform for analyzing votes. In the embodiments of the invention, large score values indicate high probability of a pencil given an observed image.

"Homography" is used herein to mean the transform relating two perspective views of a plane. This can be expressed as an 8-parameter relationship between Cartesian co-ordinates (x, y) for one plane and Cartesian co-ordinates (u, v) for the other:

$$u = \frac{p_x x + p_y y + p}{r_x x + r_y y + 1}, \; v = \frac{q_x x + q_y y + q}{r_x x + r_y y + 1}.$$

"4-connected component" is used herein to mean a set of ON pixels wherein each pixel in the set is laterally or vertically adjacent to at least one other pixel in the set.

B. Operating Principles

The basic principles used in the embodiments of the invention will firstly be described, in order to provide a proper foundation for understanding the embodiments of the invention.

Figure 1:
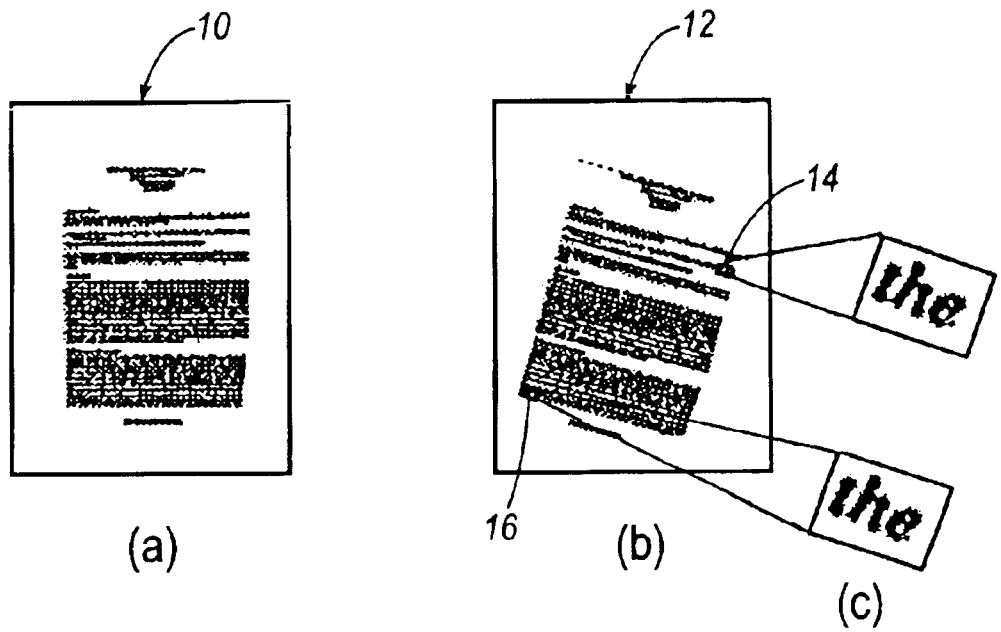
FIGS. 1(a), (b) and (c) are schematic views showing typical capture of a document image (containing skew) using a scanner.
Figure 2:
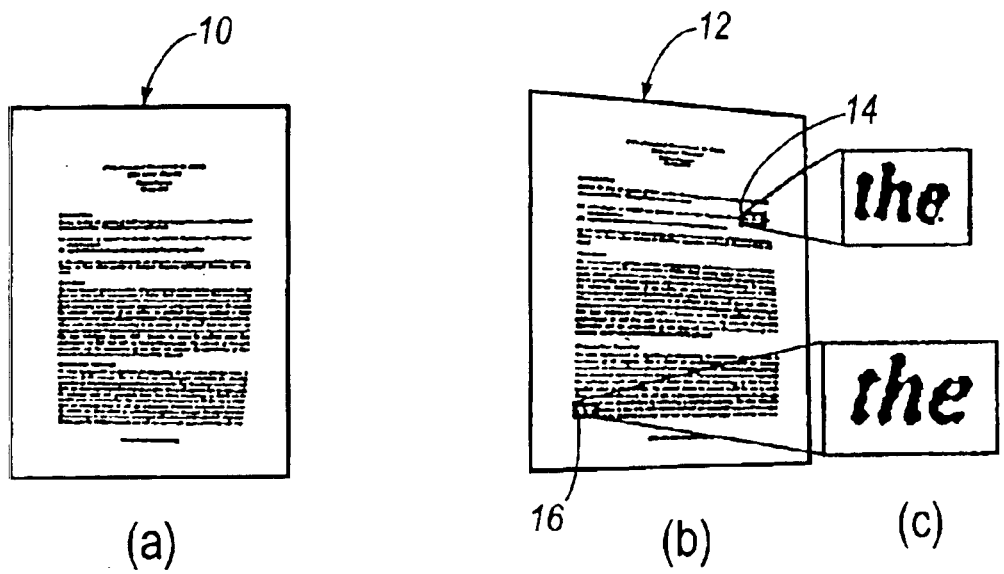
FIGS. 2(a), (b) and (c) are schematic views similar to FIG. 1 showing typical capture of a document image using a camera.
Figure 3:
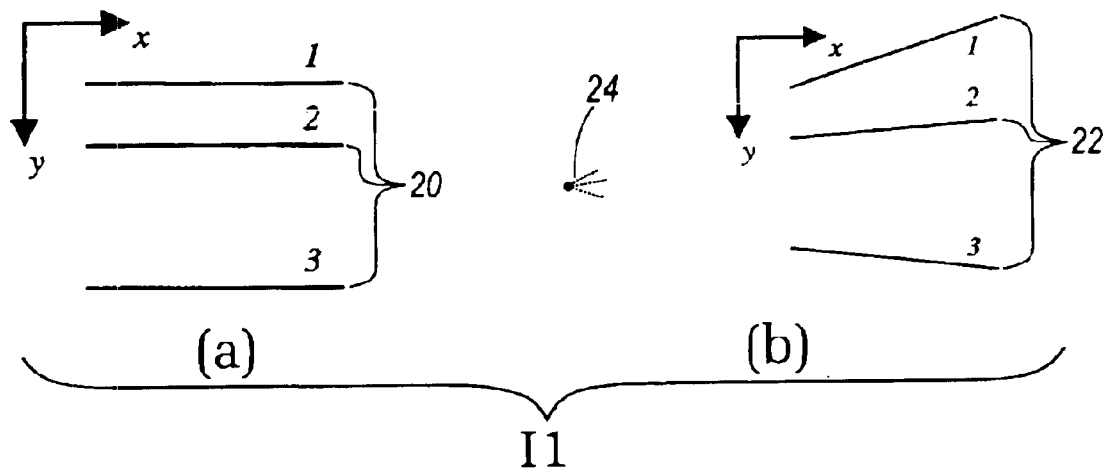
FIGS. 3(a)–(e) are schematic views showing a perspective transform applied to parallel lines, and the corresponding relation viewed in line space.
Figure 3:
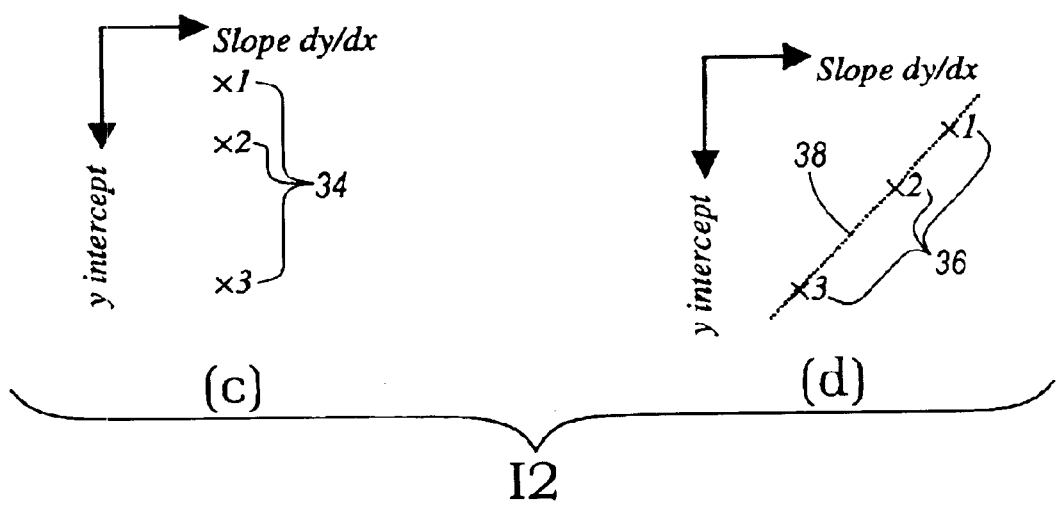
Figure 3:
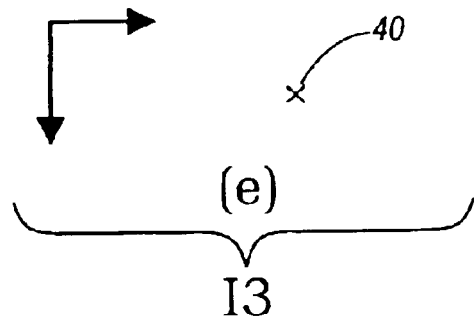

Referring to FIGS. 3a and 3b, it is well known that when perspective (e.g., perspective distortion) is applied to parallel lines 20, the lines turn into a pencil 22 through a perspective vanishing point 24.

Figure 4:
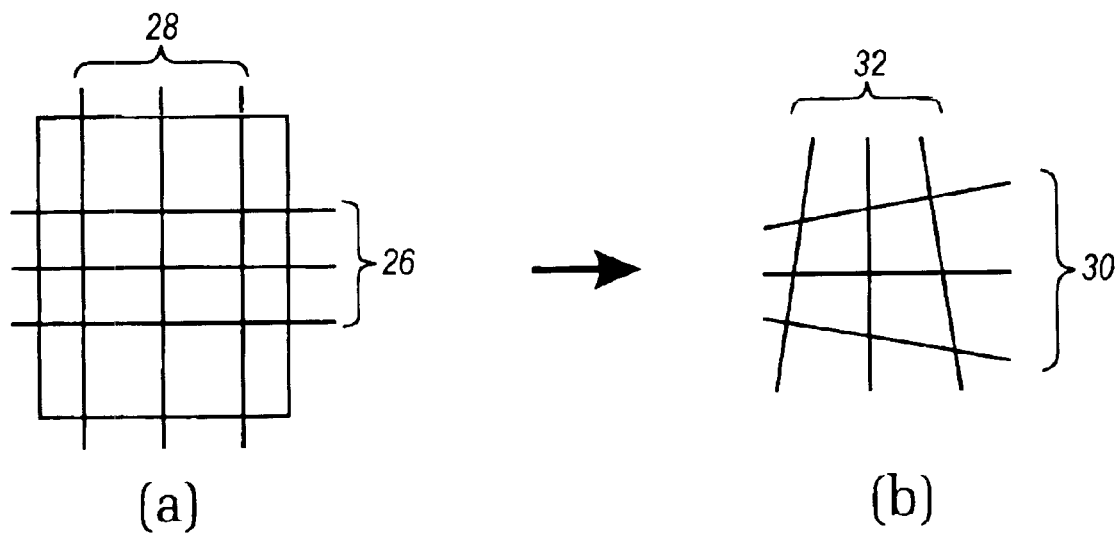
FIG. 4 is a schematic view showing the principles of correcting perspective distortion applied to a document image.

Referring to FIG. 4, in the absence of perspective, document images can usually be described in terms of two orthogonal families of parallel lines: one family 26 being parallel to the text lines; and the other family 28 being parallel to the borders of formatted text columns. These families of parallel lines may be referred to as X-lines 26 and Y-lines 28. Under perspective, these parallel lines turn into a corresponding X-pencil 30 and a Y-pencil 32.

The basic method used in the preferred embodiments of the invention is to estimate the X- and Y-pencils independently and then combine them into an estimated perspective.

Returning to FIG. 3, a first principle used in the detection, or estimation, of each pencil is that, for the lines 20 and 22, there is always a linear relationship between the slopes and intercepts of these lines irrespective of any perspective transformation (or perspective distortion) of the lines. This can be seen by plotting the lines 20 and 22 in line space (e.g., slope-intercept space defined by an intercept coordinate "y" and a slope coordinate "m" or dy/dx). In slope-intercept space, each straight line is transformed into a single point. The image in line space (e.g., slope-intercept space) is also referred to herein as I2 (being a transform of the original image I1).

FIG. 3(c) shows the parallel lines 20 transformed into points 34 lying in a vertical line in slope-intercept space. FIG. 3(d) shows the pencil 22 transformed into points 36 also lying in a straight line (dotted line 38) in slope-intercept space.

In the same way that a straight line in x-y coordinate space forms a single point in slope-intercept space, then if a further "line space transform" is applied to the slope-intercept space, then the straight line 38 will be represented as a single point 40 in the pencil space (the further transformed space) as shown in FIG. 3(e). By detecting such a point 40 in the further transformed space, then the original pencil 22 can be determined.

The equivalent image in pencil space is also referred to herein as I3 (being a transform of I2). In the present simplified example in which the input image is merely the pencil 22, I3 is a single point 40. In general, for near horizontal lines (X-lines), a row value in I3 corresponds to the slope m (dy/dx) of a line in I1 with y intercept at the top of I1 (the "top slope"). A column value in I3 corresponds to the difference in slopes between lines with y-intercept at the top and at the bottom of I1 (the slope variation).

A second principle used in the pencil estimation is that a statistic related to the probability of a line being present can be obtained by summing the values (or summing functions of values) of sampled or selected points along the line. This is also referred to as a profile of the line, defined in line space as:

$$\text{profile } p(m, y) = \Sigma_x I(x, mx+y).$$

Figure 6:
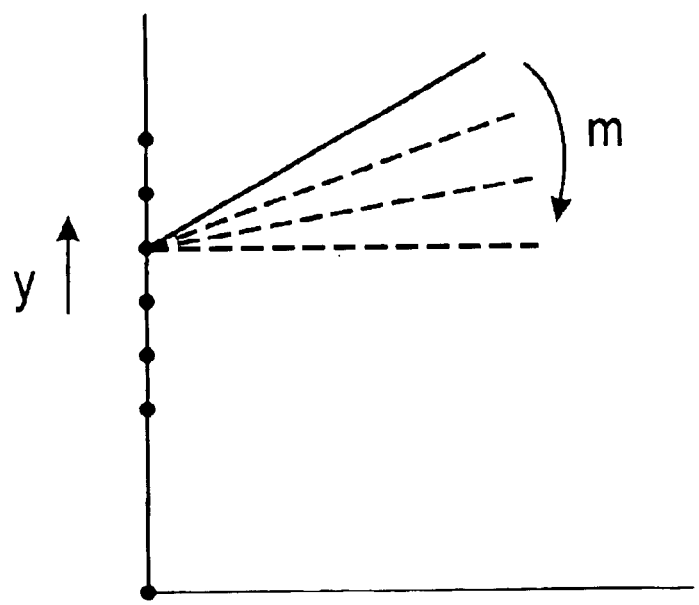
FIG. 6 is a graphical depiction of summing lines at all intercepts and all slopes.
Figure 5:
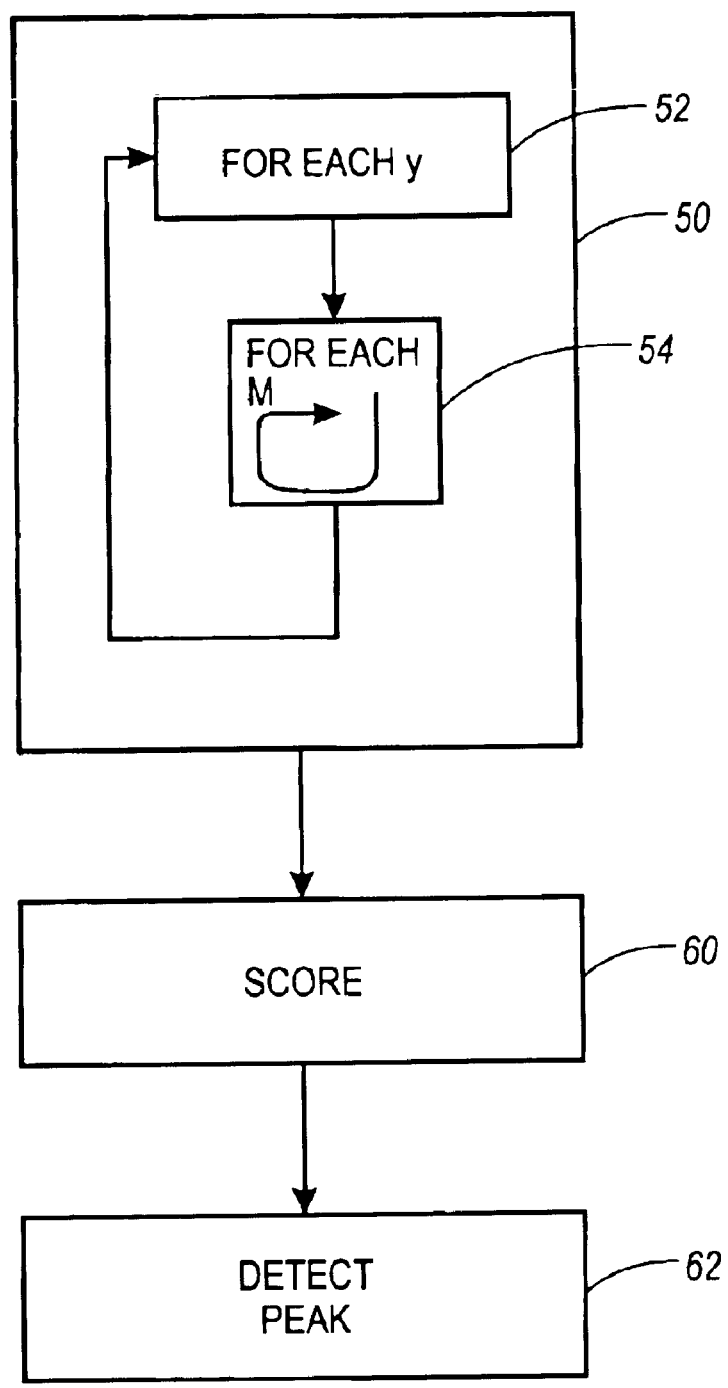
FIG. 5 is a flow diagram showing the steps for estimating a pencil.

Referring to FIGS. 5 and 6, in order to estimate a pencil using these principles, a first step 50 is to transform the input image I1 into I2 defined as profiles in line space, for each value of the intercept y and for each value of slope within a predetermined range (defined as the range of slope angles within which the pencil 22 is assumed to be present in the image). Step 50 consists of a first loop 52 repeating the calculation for each value of the y intercept, and a second nested loop 54 for repeating the calculation for each value of the slope. This is depicted schematically in FIG. 5. It does not matter which loop is carried out first, the aim being to generate a histogram image I2 in line space, the histogram bins (pixels in I2) being populated with the value of the profile p calculated along each possible line defined by the parameters y and m. This step is also referred to as "voting" for each possible line in slope-intercept space, the vote for each line being the value of the profile p.

In a second step 60, the votes (image I2) are relatively "scored" by applying a further summing function (profile) along lines in the vote, to generate the further transformed image I3. This is repeated for each intercept and slope of lines through the histogram bins, in the same manner as the loops 52 and 54. This transforms the line space image into pencil space. As explained with reference to FIG. 3(e), a pencil is defined by a single point 44 in this further transform space. Since the values resulting from the summed functions (profiles) represent probabilities, then the single point 40 corresponds to a probability peak in the values in the second transform space. At step 62, the maximum peak in I3 is detected, and this defines the parameters of the estimated pencil.

The relative height of the peak also provides an indication of the confidence in the pencil estimation. A low peak indicates low confidence, whereas a high peak indicates relatively high confidence.

Although the above discussion has focused on near horizontal lines (X-lines), it will be appreciated that the same principles can be applied to near vertical lines (Y-lines) by changing the y intercept to an x intercept, and the slope m to dx/dy.

The selection of some, or all, of the pixel values for use in the profile transforms, and the selection of the functions used in the different profile transforms, will depend on various factors. In the present embodiments of the invention, the pencil estimation is intended to be reliable even in the absence of any hard edges or any hard "straight lines" in the image. Statistical models are used to extract features in the image which provide good alignment with the text X-lines 26 and with the text column Y-lines 28. These statistical models govern the selection of pixels and the functions used in the profile transforms, and are typically different in the X- and Y-directions. This is the main reason for estimating the X-pencil 30 and the Y-pencil 32 independently of each other.

Generally, the second transformation will include a non-linear function to emphasize peaks. For example, such a function may include a $x^n$ term, where n is an integer greater than 1. In certain embodiments, a square function $x^2$ is used as a convenient function.

The above techniques may be applied both to binary images (i.e., pure black/white pixels), and to gray scale images, although it will be appreciated that the computational workload can be reduced if the image is a binary image.

Although the above discussion focuses on line space parameterized by slope and intercept (i.e., slope-intercept space), it will also be appreciated that other parameterization of line and pencil space may be used as desired. This is illustrated in an alternative embodiment described later.

Figure 7:
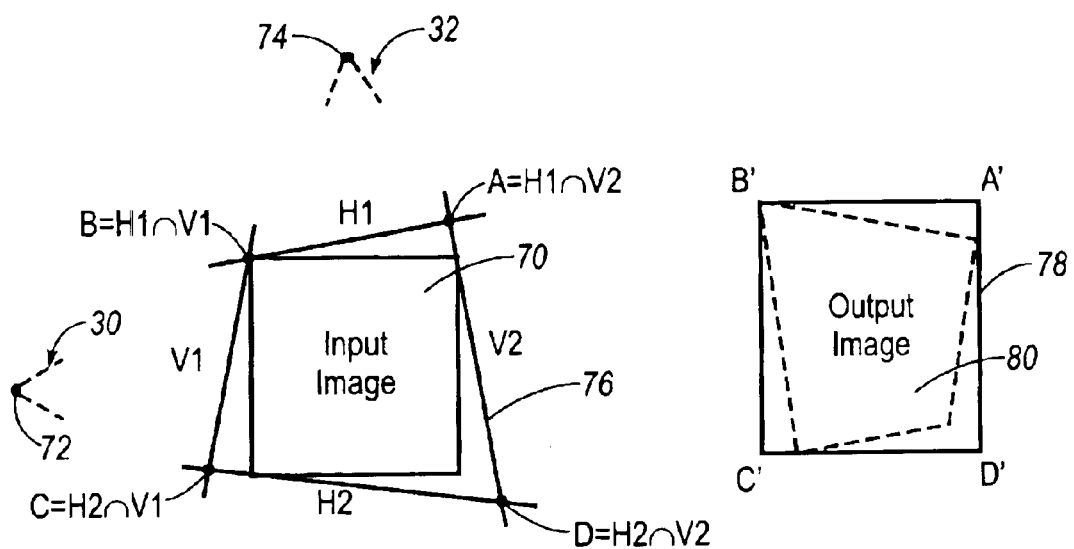
FIG. 7 is a schematic illustration of the correction of perspective using the detected X- and Y-pencils.

Referring to FIG. 7, once the X-pencil 30 and the Y-pencil 32 have been determined, the perspective distortion in the original image 70 can be corrected. This can be done in two ways:

(i) By transforming the image into a new "warped" image. This can be done by a simple geometric transformation. For example, knowing the position 72 of the X-pencil, and the position 74 of the Y-pencil, it is possible to construct a quadrilateral 76 (defined by corners A, B, C, D) being the smallest quadrilateral which bounds the original image 70. The top H1 and the bottom H2 are defined by the X-pencil 30, and the left V1 and the right V2 are defined by the Y-pencil 32.

The image is then transformed geometrically such that the quadrilateral 76 becomes a rectangle 78, (defined by corners A', B', C', D'), and the image region 70 is warped into a non-rectangular region 80 in which the perspective is corrected. The size of the rectangle is chosen such that the length of the top and bottom (i.e., A'B'; C'D') is equal to the average length of the top (AB) and bottom (CD) of the quadrilateral 76. Likewise the length of the sides (i.e., A'D'; B'C') is equal to the average length of the sides (AD and BC) of the quadrilateral 76. Given these four point correspondences, the required geometric transformation between their planes is readily determined by solving a linear equation from the eight-parameter expression for their homography.

It will be appreciated that, in transforming the image, some loss of detail or image resolution can occur. For example, in the transformed image of FIG. 7, the right side of the image is reduced to only about 80% of its original height in pixels. Similarly, the bottom edge is reduced to only 80% of its original length in pixels.

(ii) For high quality images (where the loss of resolution from a transformed image might be unacceptable), an alternative is to use the position 72 of the X-pencil and the position 74 of the Y-pencil to define a "warped" or "perspective" coordinate system to match the perspective in the image. In other words, the original image pixels are not modified, but instead a warped co-ordinate system is used to address pixels in the image.

C. Operating Embodiments

Having described the principle of operation, certain embodiments of the invention are now described in more detail.

Figure 8:
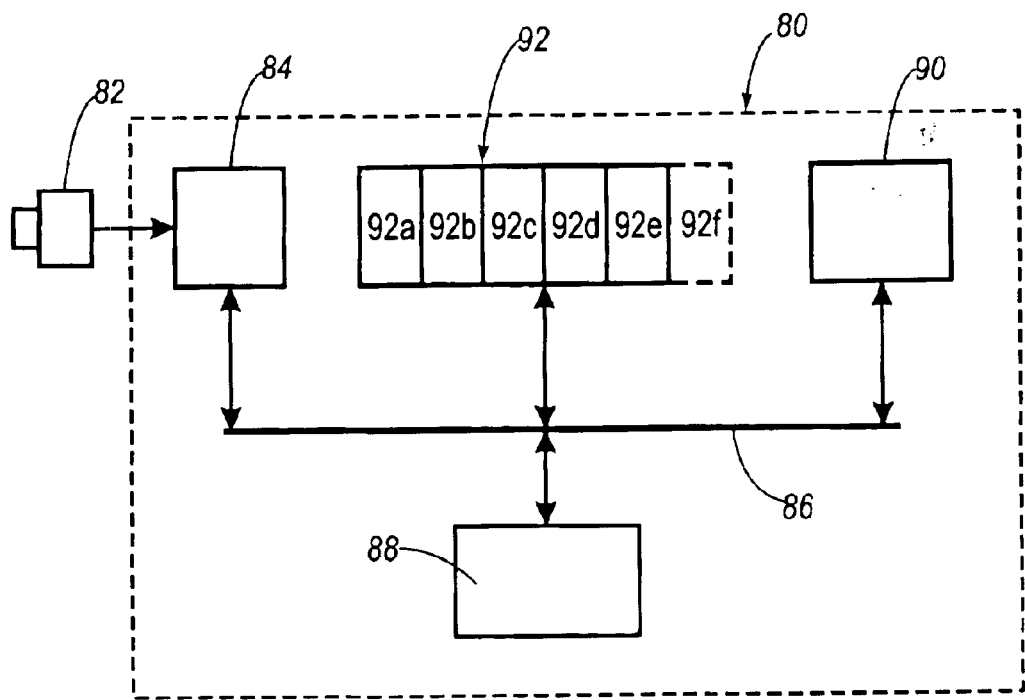
FIG. 8 is a schematic block diagram showing the functional components of an image analyzer.

Referring to FIG. 8, a processing device 80 is shown for processing an input image obtained from a document camera 82. The image may be obtained as a live captured image (if the camera is connected to the processing device 80 while the image is captured), or the image may be captured at some earlier time, and be downloaded later into the processing device 80.

The processing device 80 includes an input port 84 coupled to a main data bus 86. Also connected to the bus 86 are a processor 88, a program memory 90 for storing a processing program executable by the processor 88, and an image memory 92 for storing image data. The memory 92 includes at least an original image section 92a for storing the original inputted image, an X transform section 92b for storing a first transform of X-characteristics of the image into line space, an XX transform section 92c for storing a further transform of the line space data in section 92b, a Y transform section 92d for storing a first transform of Y-characteristics of the image into line space, and a YY transform section 92e for storing a further transform of the line space data in section 92d. The memory 92 may also include an output image section 92f (shown in a broken line as an optional memory section) for storing a perspective corrected image if desired.

It will be appreciated that the memories 90 and 92 may be part of a larger data memory associated with the processor 88, and may consist of any suitable storage device or devices such as semiconductor memory, optical memory or magnetic memory. If a filing system is used, then the different memory sections 90 and 92a–92f may be implemented as different files in the filing system. It will also be appreciated that the processing device 80 may be implemented using a standard computer including other components such as a user keyboard, and a video output device. However, such components are not shown in FIG. 7, as they are not key to the processing to resolve perspective.

Figure 9:
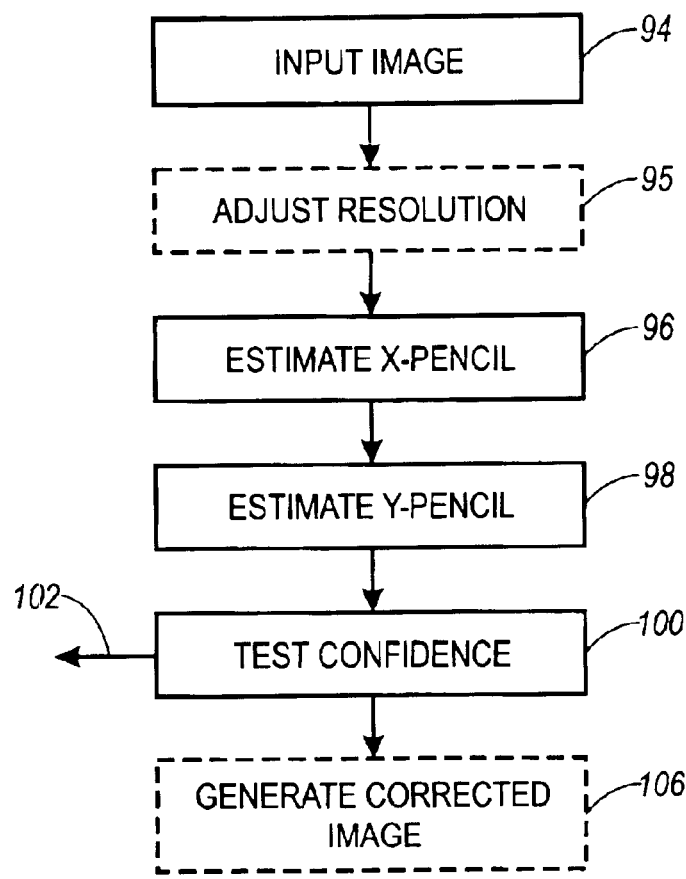
FIG. 9 is a schematic flow diagram showing the steps carried out by the processor of FIG. 8.

Referring to FIG. 9, the processor 88 is controlled by software (contained in the program memory 90) to execute a first step 94 of inputting the image data from the input port 84 into the input image section of memory 92a.

Step 95 is an optional step for reducing the resolution of the image for the purposes of the perspective estimation, in order to reduce the computational workload. For example, if the resolution of the image is greater than about 100 dpi, then it might be beneficial to reduce the image resolution to about 100 dpi. Such a reduced resolution can still yield reliable perspective estimation, with good accuracy. Additionally, or alternatively, step 95 may also include a binarization step if it is desired, for the purpose of perspective estimation, to convert a gray-scale image into a binary image.

At step 96, an X-pencil estimation routine is carried out to estimate the X-pencil corresponding to the distortion of near-horizontal features in the image. At step 98, a Y-pencil estimation routine is carried out to estimate the Y-pencil corresponding to distortion of near vertical features in the image. It is not critical that the X-pencil be estimated first, and the order may be reversed if desired. Alternatively, the two pencils may be estimated in parallel in a parallel processing environment.

At step 100, a test is carried out to determine the confidence factor of the X- and Y-pencils. If one or both of the pencils is determined to have too low a confidence factor, then the process branches to a "fail" path 102, to indicate that the perspective cannot be resolved (and that another technique must therefore be used).

Assuming that both pencils are estimated with sufficient confidence, then the process proceeds along path 104 to any further processing of the image which may be desired, for example, a perspective correction routine (depicted at 106) to generate a perspective corrected image in the output section of the memory 92f (using the geometric principles illustrated in FIG. 6).

Examples of specific routines for estimating the X- and Y-pencils are now described, using the principles described with reference to FIGS. 1–5. Generally, these methods can be used for either a binary image, or a gray-scale image. However, for the preferred form of Y-pencil estimator, two separate explanations are provided, Example 2 being for a binary image, and Example 3 being for a gray-scale image.

D. X-Pencil Estimator

EXAMPLE 1

Referring to FIG. 5, the first example of the X-pencil estimation routine includes the steps 50, 60 and 62 as described previously.

At step 50, a first profile p(m, y) is applied to the image pixels stored in memory 92a, to construct a profile of the image in line-space for every possible value of slope m, and intercept y. The intercepts are considered in the range y=0, 1, 2, . . . , h−1, where h is the height of the input image. 401 slopes m equally spaced in the interval [−0.4, 0.4] are computed for each value of y. It will be appreciated that the angular resolution may be increased or decreased as desired. The results of the first profile transformation are stored in memory 92b.

At step 60, a second (score) profile transformation S is applied to each pixel (bin) in the transformed image stored in memory 92b, and the result is stored in memory 92c.

The profile transformation p, and the score transformation S are based on an enhancement of an aforementioned skew estimator proposed by PostI and further developed by Bloomberg, which are incorporated herein by reference.

The skew estimator took the sum p(m, y) along lines through the observed image I for a set of slopes m and for all y-intercepts y:

$$p(m, y)=\Sigma_x I(x, mx+y).$$

The skew is taken to be the slope that maximizes summed square gradient of the profile p:

$$S(m)=\Sigma_y g(m, y)^2,$$

where g(m, y)=p(m, y+1)−p(m, y).

As indicated in the previous discussion, a pencil is just a set of lines with a linear relation between slope and intercept. Thus an analogous X-pencil estimator would select the pencil $\Lambda=(\alpha,\beta)$ that maximizes the score function:

$$S(\alpha,\beta)=\Sigma_y g(\alpha y+\beta,y)^2.$$

This score function has the following appealing properties:

(a) It is invariant to black-white inversion and scaling of the width of the image;

(b) It is insensitive to smoothly contributions to the profile, such as produced by half-tone regions; and (c) It is relatively insensitive to biasing due to the presence of multiple text columns whose lines are out of phase.

Typically the gradient g(m, y) is much sparser than the profile p(m, y) in the sense that |g(m, y)| is large only for a few values of m, y. Such large values correspond mainly to text baselines and mid-lines. This sparsity enhances the sharpness of the peak of S.

Just as p (i.e., the first transform) is a sum over lines through the image I, S (the second transform) is the sum over lines through an image whose pixel values are g(m, y)².

The computational efficiency of this second sum can be greatly improved by thresholding g at some level τ prior to computing S. Such a thresholded function $S_\tau$ may be defined as:

$$S_\tau(\alpha, \beta) = \Sigma_y g_\tau(\alpha y + \beta, y)^2,$$

where:

$$g_\tau(m, y) = g(m, y) \text{ if } |g(m, y)| > \tau,$$

or zero otherwise.

Since g is typically sparse, thresholding has little negative impact on the quality of the resulting pencil estimates, and may even improve the estimation results.

The threshold τ is defined as $\tau = \sigma \cdot \sqrt{(2.\log.N)}$ where N is the number of values at which m, y has been evaluated, and σ is the following robust estimate of the noise in g:

$$\sigma = (\text{median } |g(m, y)|)/0.6745.$$

E. X-Pencil Estimator

EXAMPLE 2

Although example 1 is currently preferred, an alternative example is also given to show the variety of techniques which may be employed.

Figure 10:
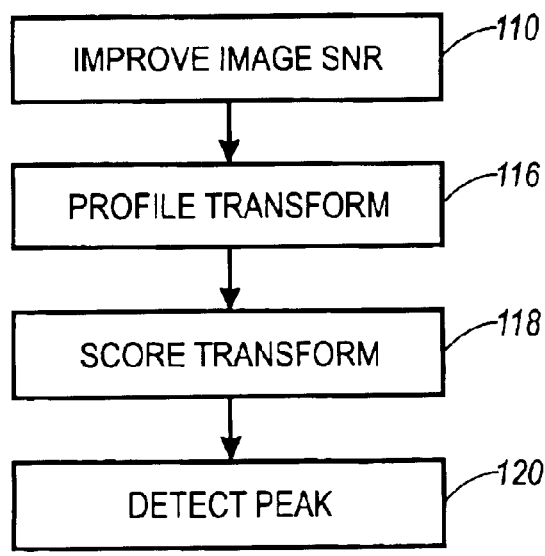
FIG. 10 is a schematic flow diagram showing the process steps for a second example of X-pencil estimator.

Referring to FIG. 10, the routine for the second perspective estimator includes an optional first step 110 to improve the signal to noise ratio in the X-direction. When searching for typical near-horizontal features, such as text baselines, the SNR improved image is obtained by computing a vertical difference image. This has a maximum value when two vertically adjacent pixels are very different, and 0 when they are the same. The vertical gradient has benefits for subsequent steps:

(a) It is essentially a decorrelating process and so sharpens peaks in the line sums;

(b) It allows for interference of lines in adjacent text columns that have relatively displaced baselines; and (c) It makes the procedure invariant to black or white text.

Figure 11:
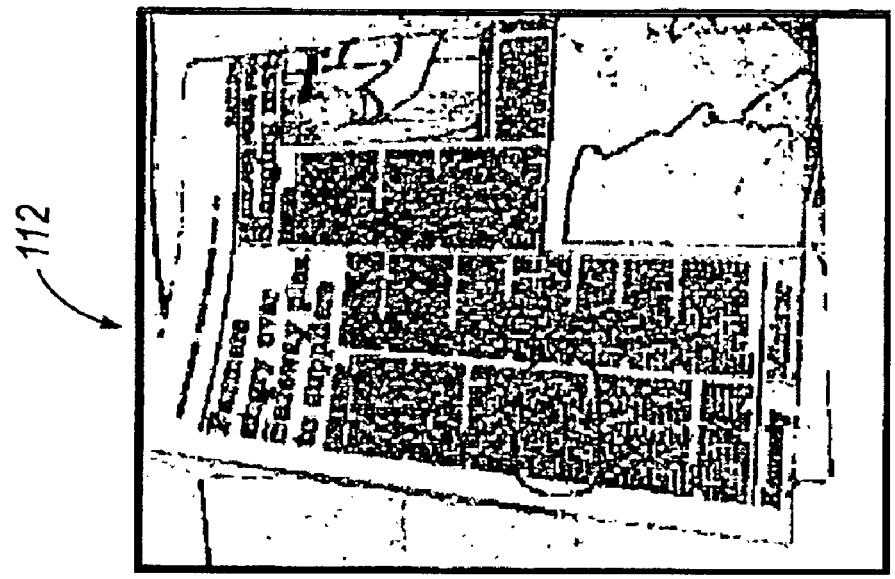
FIG. 11 is a schematic illustration showing the creation of a vertical difference image.
Figure 11:
Figure 11:

FIG. 11 illustrates a typical vertical difference image 112 obtained from an input image 114.

At step 116, a first profile p(m, y) is applied to the vertical difference image from step 110, to construct a profile of the image in line-space for every possible value of slope m, and intercept y. The intercepts are considered in the range y=0, 1, 2, ..., h−1, where h is the height of the input image. 401 slopes m equally spaced in the interval [−0.4, 0.4] are computed for each value of y. It will be appreciated that the angular resolution may be increased or decreased as desired. The results of the first profile transformation are stored in memory 92b.

The first profile transformation p is $p(m, y) = \Sigma_x I(x, mx+y)$.

It will be appreciated that steps 110 and 116 may be combined into a single step, such that the vertical difference calculation is performed as a function in the summed profile. For example, such a combined profile transformation might be:

$$p(m, y) = \Sigma_x f(x, mx+y)),$$

where $f(x, mx+y) = I(x, mx+y+1) − I(x, mx+y)$.

At step 118, a second (score) profile transformation S is applied to each pixel (bin) in the transformed image stored in memory 92b, and the result is stored in memory 92c. The score function S is defined as a sum of squares of pixel values along lines in I2.

At step 120, the peak detection is carried out to determine the peak corresponding to the X-pencil.

If desired, in a similar manner to that of the first example of X-pencil estimator, a threshold τ may also be applied to the score function S, so that only values exceeding the threshold τ are used in the S transformation. This can reduce the computational workload, and may also improve the estimation results.

F. Y-Pencil Estimator

EXAMPLE 1

A first example of Y-pencil estimator will be described which is most similar to the X-pencil estimators described above. However, for reasons explained below, the second example of Y-pencil estimator is preferred in practice.

The Y-pencil estimator (in this first example) includes steps which are analogous to the steps 110, 116, 118, and 120 described with reference to the second example of the X-pencil estimator. Only the differences are described here.

In order to improve the SNR of the image for detecting Y-lines (such as justified column boundaries), the image is dilated (i.e., is made more black). Each black pixel is dilated into a 3×3 pixel structure (or larger structure, depending on the input image resolution and font sizes), followed by filling isolated holes. This has the effect of "filling in" the text characters to form continuous blocks representing the text columns. The borders of the columns are then extracted by taking a horizontal difference image, while shifting the resulting difference pixels to compensate for the initial dilation.

Figure 12:
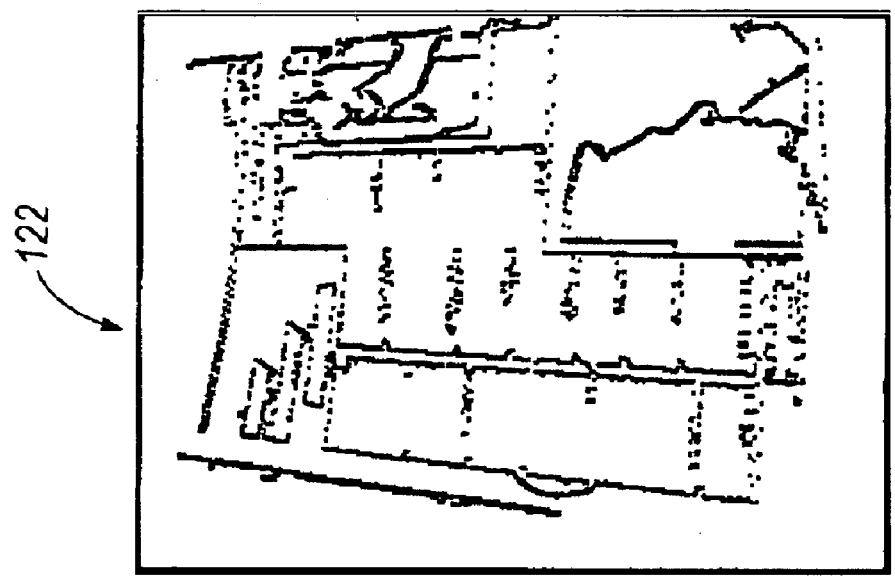
FIG. 12 is a schematic illustration showing the creation of a horizontal difference image.
Figure 12:
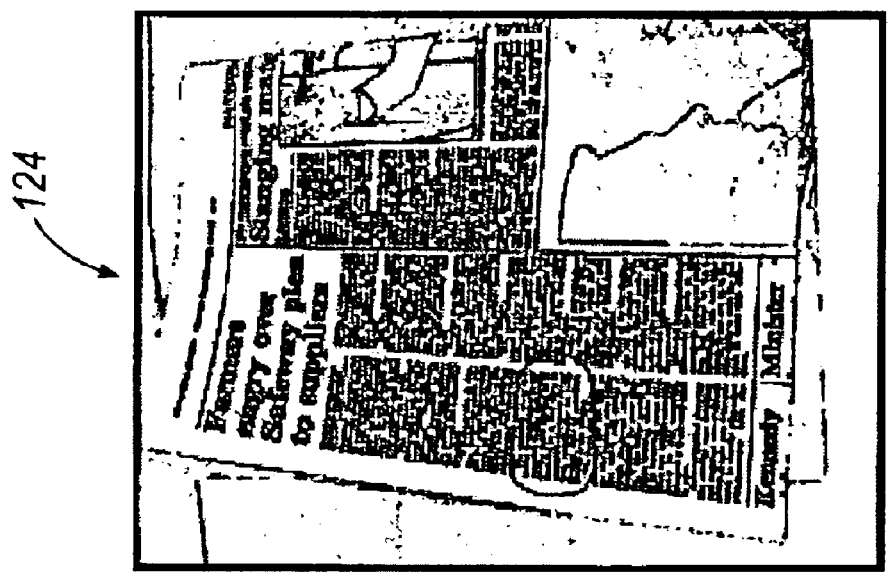

FIG. 12 illustrates a typical horizontal difference image 122 generated by the above method from an original image 124.

The remaining steps 116–120 are directly analogous to those described for the X-pencil estimator, but transposed to detect near vertical lines rather than near horizontal lines. Also since a horizontal difference has already been taken, it is unnecessary to compute a further difference between adjacent profiles prior to squaring, as is performed for the X-pencil estimator.

This type of Y-pencil estimator provides satisfactory results, but is rather dependent on the line spacing between text lines in a column. The method depends on the dilation being sufficient to cause adjacent text lines to merge into a continuous block. However, if the line spacing is too large (i.e., larger than the dilation of each line), then this type of Y-pencil estimator may fail.

G. Y-Pencil Estimator

EXAMPLE 2

To address the above problem, a second type of Y-pencil estimator has been developed. The following discussion assumes a binary (i.e., only black/white) image. The principles will be expanded in Example 3 to cover gray-scale images.

Figure 13:
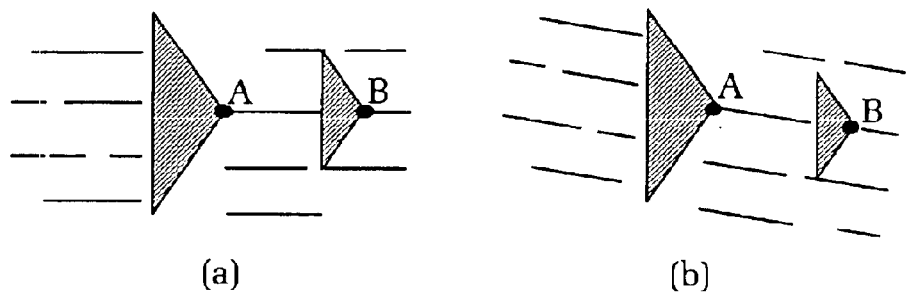
FIG. 13 is a schematic illustration showing the detection of white space for determining points representative of a column boundary.

Referring to FIG. 13, the second technique is to select pixels in an image as being representative of a column border depending on the amount of white space adjacent to the pixel. Points which are adjacent to a relatively large white space are more likely to form part of a column boundary. A good choice for this white space should allow detection of as many aligned text edges as possible, but also as few spurious large white spaces as possible.

In this example, for computational convenience, a significant white space is detected by matching with a single shape. The shape should be quite tall in order that spaces in the middle of text lines can be eliminated from consideration by observing that a text line above or below does not have a corresponding space. However, the shape should preferably not be perfectly rectangular, since there is often noise on the side of characters. Also, a rectangular shape might not allow detection of indented edges of aligned text.

As illustrated in FIG. 13, the present example uses an isosceles triangle as a choice of shape that meets the above considerations. The "scale" of the triangle is considered to be its height as measured from the vertex about which it is symmetric.

The next consideration is to decide what size (or scale) of triangle should be defined in order to identify significant white spaces representative of column borders. As can be seen in FIG. 13, the optimum scale in general depends on the line spacing between adjacent lines of text, on the inter-word spacing and on the width of column spaces. If the scale is too small relative to the line spacing (as in the case of triangle B in FIG. 13), then the edges of words in the middle of lines may be detected instead of the edges of text columns. It will be appreciated that the line spacing is typically not known, and also that the line spacing may vary in the document itself.

In the present example, this problem is resolved by "trying" a plurality of scales for the triangle, and using the scale which produces the best value for the confidence in the peak of the score function. Preferably five equally spaced scales are taken for this triangle for scales which produce between 10 and 1000 selected pixels.

Figure 14:
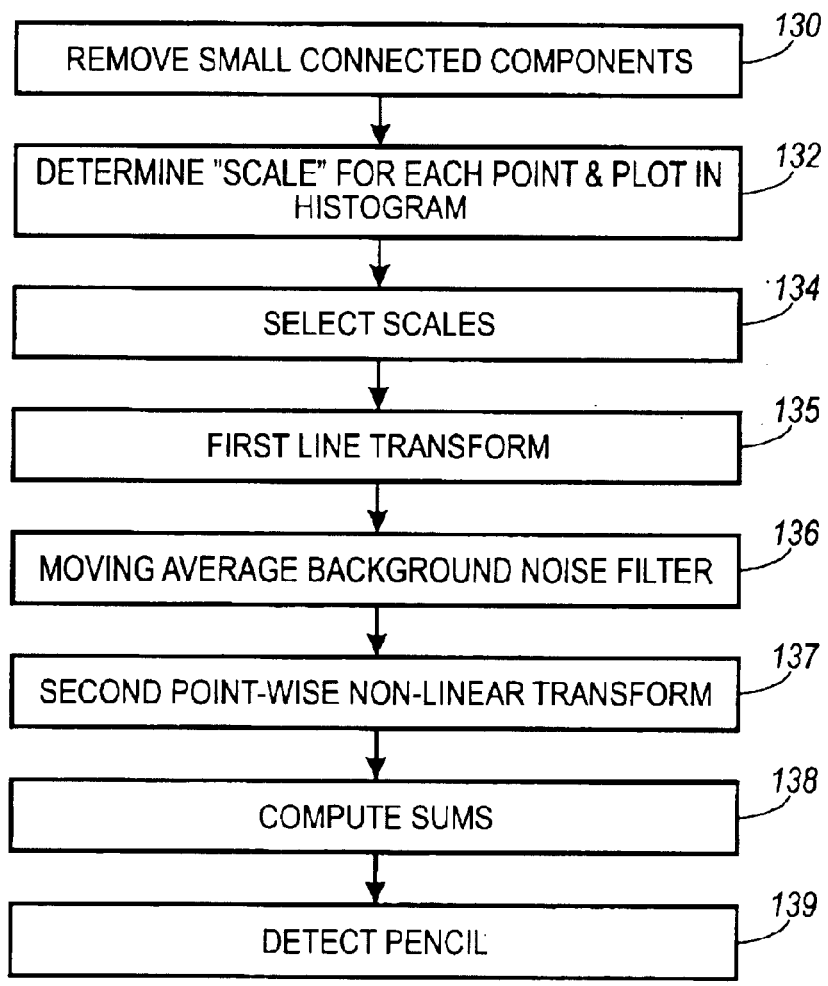
FIG. 14 is a schematic flow diagram showing the process steps for a second example of a Y-pencil estimator.

This process is illustrated in more detail in FIG. 14.

At step 130, in order to increase the robustness of the point detection to noise, the image is firstly filtered to remove any 4-connected components of area less than 7 pixels.

At step 132, the "scale" of each connected component in the image is detected, by growing a triangular region from the central left- and right-most points of the connected component, until the triangle reaches another connected component. The "scale" of the triangle provides an indication of the amount of adjacent white space. These scales are then plotted in a histogram of all detected points.

At step 134, the scales corresponding to selecting (preferably) 10 and 1000 points are detected. If there are no such scales, the minimum and maximum scales present in the image are instead employed. Preferably, five equally spaced scales in this range are determined.

At step 135, for each of these scales, iterating from large to small scale, a first line transform is computed. The line transform for a scale s counts the number of points of scale greater than or equal to s lying on each line. This line transform is maintained from iteration to iteration, so that when the line transform for a smaller scale s' is computed, only points with scales lying between s and s' need to be added into the transform.

At step 136, a zero-centered moving average filter is applied to the line-transformed image to estimate the level of background noise. Such background noise is due to the presence of spurious points that are not parts of aligned structures but are adjacent to large white spaces. A zero-centered moving average is preferred to a simple moving average since its value is not increased by large values at the center of the window that may correspond to actual aligned structures. The average is taken only over different intercept values, hence a single point in the original image appears in at most one term of the average. The zero-centered moving average is preferably computed as $$\mu_s(m, x_0) = \max\left\{0.1, \frac{\sum_{u=x_0-w}^{x_0-2} I_s(m, u) + \sum_{u=x_0+2}^{x_0+w} I_s(m, u)}{2w - 2}\right\}.$$

Here $\mu_s(m, x_0)$ denotes the moving average for scale s for the point in the line transform corresponding to the line with intercept $x_0$ and slope m: that is, the line $x = x_0 + my,$ through the original image. $I_s(m,u)$ denotes the line transform at scale s for the line with intercept u and slope m. w denotes the half-width of the moving average window, which preferably has the value 30. The maximum operation provides a lower bound on the mean background noise: in situations where no selected points are observed, this prevents numerical instability in, and improves robustness of the point-wise non-linear transform in the following step 137.

At step 137, a point-wise non-linear transform is applied to the line transform. This transform is chosen to produce low values where the line transform has a magnitude comparable with the background noise. Hence the transform depends on the zero-centered moving average value. The non-linear transform should also saturate, that is approach some limiting maximum value, for large values of the line transform. The benefit of saturation is that it makes the system more robust to clutter. Clutter refers to strong but irrelevant alignment information. Such clutter may arise for example from pages underlying the page of interest or lines in diagrams on the page of interest.

Preferably the non-linear transform f has the form:

$$f(I_{\lambda s}) = \max\left\{0, \log\left\{\frac{e^{\mu_{\lambda s} - \rho}\left(\frac{\rho}{\mu_{\lambda s}}\right)^{I_{\lambda s}}}{1 + \gamma e^{\mu_{\lambda s} - \rho}\left(\frac{\rho}{\mu_{\lambda s}}\right)^{I_{\lambda s}}}\right\} - \kappa\right\}.$$

For compactness, this equation denotes a line by a subscript $\lambda$, rather than by a pair of arguments $(m, x_0)$, as in the definition of the zero-centered moving average. Thus $\mu_{\lambda s}$ denotes the zero-centered moving average for scale s for the point in the line transform corresponding to the line $\lambda$. $I_{\lambda s}$ denotes the value of the line transform of image I for a line $\lambda$ at scale s. The parameter $\gamma$ is an estimate of the ratio of the frequency of clutter edges to actual aligned edges. This is preferably set to 0.005. The parameter $\rho$ is an estimate of the mean value of $I_{\lambda s}$ on lines that contain significant alignment information. This is preferably set to 20. The parameter $\kappa$ is essentially a lower threshold on the significance of a line. It is preferred to set $\kappa = 0$.

At step 138, line sums are computed through the array of values of $f(I_{\lambda s})$. Each such sum for a line $\Lambda$ through the array, is the score for the pencil corresponding to $\Lambda$. These sums are not purely sums over all lines on a given pencil, as is the case with X-pencil estimation, but rather can only include terms corresponding to lines in the original image which are at least a certain distance apart. The distance between two lines $\lambda_1 = (m_1, x_1)$ and $\lambda_2 = (m_2, x_2)$ is measured as $d(\lambda_1, \lambda_2) = |x_1 - x_2|.$ In particular, for any pencil Λ, the preferred method selects some subset $S_\Lambda$ of lines from Λ which gives a maximal value to the sum of $f(I_\lambda s)$ values, subject to the constraint that $d(\lambda_1,\lambda_2) \geq \Delta_s$ for all pairs of distinct lines in $S_\Lambda$, where $\Delta_s=0.7$ s. Thus the score for a pencil Λ may be written as $$\text{score}(\Lambda) = \max_{S_\Lambda \subseteq \Lambda} \sum_{\lambda \in S_\Lambda} f(I_{\lambda s}) \text{ subject to } d(\lambda_1, \lambda_2) \geq \Delta_s \text{ for all } \lambda_1, \lambda_2 \in S_\Lambda.$$

To compute this score efficiently, it is preferred to re-write it as a dynamic programming problem, defining a recursively computable value function V(x;α, β) for a pencil Λ=(α, β) by $$V(x;\alpha, \beta) = \max\{f(I_s(\alpha x+\beta, x)) + V(x-\Delta_s;\alpha, \beta), V(x-1)\}.$$

Here the notation used for defining the zero-centered moving average has been employed for explicitness. The initial value of the value function is zero and the value at the far side of the image where x=W−1 for an image of width W is just the score. That is, $$\text{score}(\Lambda) = V(W-1;\alpha, \beta).$$

Since the array of values of $f(I_{\lambda s})$ typically contains very few non-zero values, the set of dynamic programming problems for all values of Λ=(α, β) can be performed very efficiently. In particular, the value function is computed for all values of Λ=(α, β) simultaneously, iterating over x. When a non-zero value of $f(I_{\lambda s})$ is encountered for some line λ=(m, x), the value functions for the pencils Λ=(α, β) satisfying m=αx+β are all updated according to the recursive definition of V. At first glance, this update appears to require storage of V(x−k;α, β) for k=0, 1, . . . , $\Delta_s$, and for all values of α, β. However, This is actually unnecessary and it is preferred to store a list only of those values of V(x−k;α, β) that can possibly be required for computing the update at any stage.

Two other techniques can also be successfully employed for speeding up the computation of this score. These techniques may also be combined with the above method. Firstly, a heuristic upper bound on the score for a pencil Λ=(α, β) can be computed by taking the maximum value of f($I_s$(m, x)) over successive ranges of x of width $\Delta_s$. Thus, defining:

$$\hat{f}(m.a\Delta_s) = \max_{x \in \{a\Delta_s, a\Delta_s+1, \ldots, (a+1)\Delta_s-1\}} f(I_s(m, x)),$$

in terms of this upper bound, yields:

$$\text{score}(\Lambda) \leq \sum_{a=0}^{(W-1)/\Delta_s} \hat{f}(\alpha a\Delta_s + \beta, a\Delta_s).$$

Thus, an efficient method is to first compute this upper bound on the score by a simple line summing procedure, then to evaluate the full dynamic programming problem over only those lines that had large values for the upper bound. At each stage, full dynamic programming scores replace upper bound scores. When a score obtained by dynamic programming is greater than all other scores (whether obtained by upper bounding or by dynamic programming) then it is the actual score value. The second speedup technique sub-samples the values of m and x and computes the scores by dynamic programming at a coarse resolution. Then the resolution is refined at places where the score is high.

At step 139, the pencil giving maximum score is selected as the perspective estimate for the given scale.

H. Y-Pencil Estimator

EXAMPLE 3

In another alternate embodiment, the estimation is performed directly on a grayscale image. In X-pencil estimation, this is simply a matter of performing the initial line sums through the observed image as sums of gray values, other steps remaining as described for other embodiments. In Y-pencil estimation, a method based on grayscale morphology is employed for detecting points adjacent to large white triangles. This method actually reduces to that employed in the binary case (Example 2 above). Otherwise Y-pencil estimation proceeds as in other examples.

Figure 15:
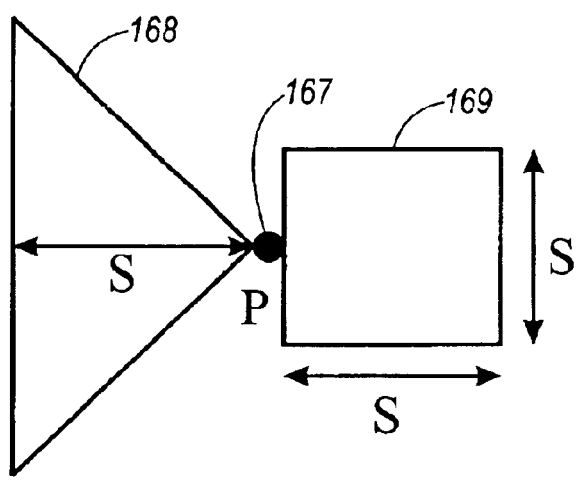
FIG. 15 is a schematic illustration showing the detection of white space for determining points representative of a column boundary in a gray-scale image.

Referring to FIG. 15, the method firstly considers the detection of points with a white triangle of scale s to their left. For each point p (e.g., point 167), the maximum gray value in such a triangle (not including point p) is computed (e.g., triangle 168). This maximum is denoted by TL(p,s). The method then finds the minimum gray value of points in a square of side length s (e.g., square 169), which has the center of its left hand side immediately to the right of point p (e.g., point 167). This minimum is denoted by BL(p,s). A recursive updating procedure is employed to efficiently compute the maxima and minima over squares and triangles for multiple scales.

Point p is selected at scale s if its gray value I(p) in the original image meets the following test condition:

$$I(p) < TL(p,s) - \tau \text{ and } I(p) \geq BL(p,s).$$

Here τ is a threshold that trades the level of noise in the input image that may be tolerated, with the minimum required contrast between text foreground and white background. For typical camera images with a noise standard deviation of 3 gray values, and minimum contrast of 40 gray values, it is preferred to set τ=12. The second part of the test involving BL(p,s) prevents the detection of isolated dark points such as junctions in text characters, rather favoring the selection of points on the blurred boundary of a character.

An analogous test is considered for a triangle to the right of any point and a square to the left. The scale of a point is the maximum value of s for which either the left or right triangle test is satisfied. Although the second part of the test involving the square may cause points detected at some large scale s, to not be detected at a smaller scale s', this definition of the scale of a point removes this difficulty so that an incremental updating to line sums is possible from coarse to fine scale. Clearly the possibility of many similarly performing alternate structuring elements (other than a square and triangle) and tests on gray values is implied by this example.

I. Alternative Embodiment (Guassian Pencil Space)

In other alternative embodiments, a different parameterization can be employed for line space or pencil space. In cases where the angle between the optical axis of the camera and the document or the skew angle of the document may be large, a parameterization that uniformly samples the angles of lines and their distance to the origin of the image plane is beneficial. This is because such a parameterization has no singularities and inaccuracies due to the sampling of line space can be minimized.

Figure 16:
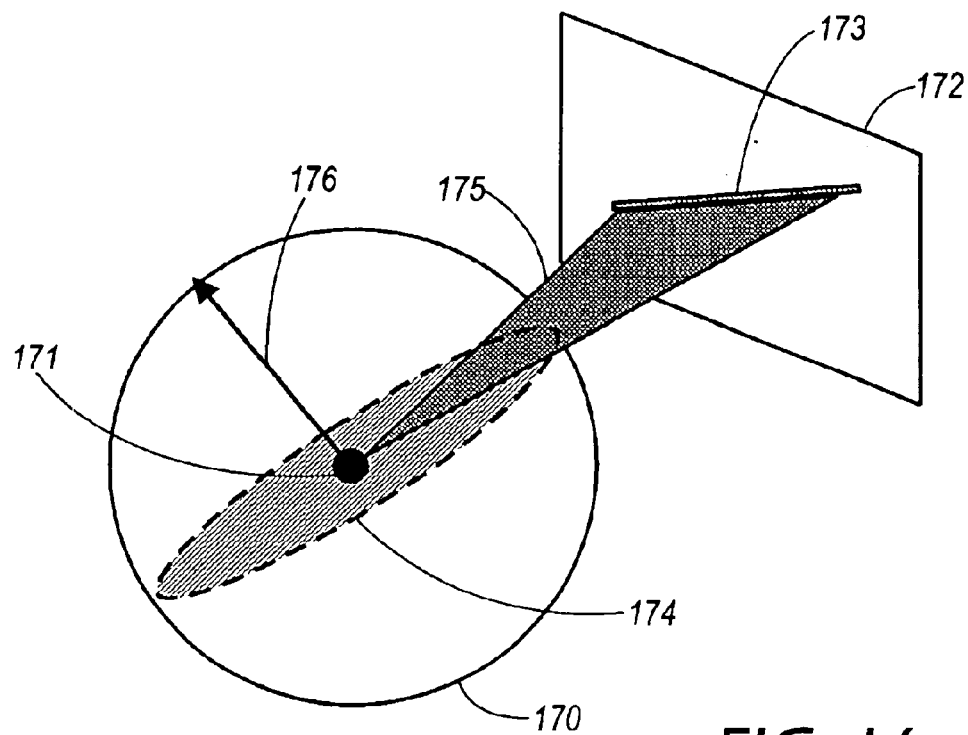
FIG. 16 is a schematic diagram showing the principles of an alternative embodiment in which pencil space is parameterized in terms of a Gaussian sphere.

Similar benefits may be derived by parameterizing pencil space in terms of a Gaussian sphere. A Gaussian sphere is considered to be a unit sphere centered at the origin. The image plane is considered to be normal to the z-axis of a Cartesian co-ordinate system at some distance z from the origin. The origin of the image plane is at point (0,0,z) in Cartesian co-ordinates. A point in the image projects onto a Gaussian sphere where the line between that point and the origin intersects the sphere. As shown for example in FIG. 16, a line 173 in an image plane 172 forms a great circle 174 on a Gaussian sphere 170 where the plane 175 (with normal 176) formed by the line 173 and the origin 171 intersects the Gaussian sphere 170. The points where two great circles intersect, that are formed by two lines in an image, is the projection of the vanishing point associated with the pencil from which the two lines are drawn.

To formulate the present perspective estimation method in this alternative parameterization, the distance to the origin of the image plane and the angle of a line are denoted by $(\rho,\psi)$ so that the line is:

$$x \cos \psi + y \sin \psi = \rho.$$

The spherical polar co-ordinates of the Gaussian sphere are denoted by $(\theta,\phi)$, so that the Cartesian co-ordinates of any point on the sphere are:

$$(\cos \theta \cos \phi, \sin \theta \cos \phi, \sin \phi).$$

In the first stage of estimation, the vote $I_\lambda$ for a line $\lambda=(\rho,\psi)$ is extracted by summing along that line through the image:

$$I_\lambda = \sum_u I(\rho\cos\psi - u\sin\psi, \rho\sin\psi + u\cos\psi).$$

As in other embodiments, this sum is only over points selected at some scale when estimating the Y-pencil, and values of this sum are actually differenced for adjacent $\rho$ values when estimating the X-pencil. A point-wise non-linear transform is applied to this vote, to obtain an array of values:

$$f_\lambda = f(\rho,\psi).$$

In the second stage of estimation, scores are accumulated for a given pencil $\Lambda=(\theta,\phi)$ by summing these values over lines $\lambda=(\rho,\psi)$ that are part of this pencil:

$$\text{score}(\Lambda) = \sum_\psi f\left(z\frac{\cos(\theta-\psi)}{\tan\phi}, \psi\right).$$

As in other embodiments, this score for the Y-pencil, is preferably iterated over scales, and maximized subject to a constraint on the spacing between lines i.e., only terms for $\psi_1$, $\psi_2$ such that:

$$\left|z\frac{\cos(\theta-\psi_1)}{\tan\phi} - z\frac{\cos(\theta-\psi_2)}{\tan\phi}\right| \geq \Delta_s$$

can be simultaneously included.

In the preferred slope-intercept parameterization (first embodiment), one may either sum over each line of the observed image to find the votes, or update the array of votes by adding a line to it for each point in the observed image. Similarly, one may compute the scores either by summing along lines through non-linearly transformed vote array or by adding a line to the score array for each non-zero point in the vote array. Analogous alternatives exist for the uniform angular parameterization. For computing votes, one either sums along lines through the input image, or adds in sinusoids to the vote array. For computing scores, one either sums along sinusoids through the vote space, or adds in great circles to the Gaussian sphere for each non-zero point in the non-linearly transformed vote array.

J. Alternative Embodiment—Line Summing

There are several comparably performing methods for computing line sums of non-sparse data for estimating the X-pencil. One approach is for each slope, to apply a skew transformation to the image and sum along horizontal lines in this transformed image. The second is to directly sum along oriented lines through the image.

A third approach, described below, is much more efficient when only small line angles are considered.

Figure 17:
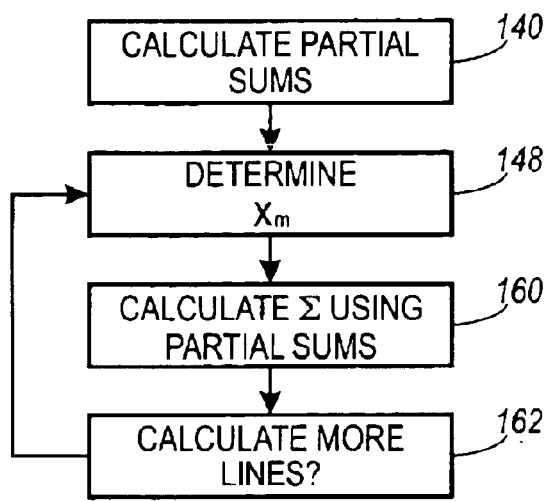
FIG. 17 is a schematic flow diagram showing the steps of a method of calculating line sums using a partial sum approach.

Referring to FIG. 17, the method includes first step 140 of computing an array of partial sums PS(x,y) along horizontal lines through the image I:

$$PS(x, y) = \sum_{u=0}^{x} I(u, y).$$

This is preferably performed recursively in x, so that $PS(x+1,y)=PS(x,y)+I(x+1,y)$.

Figure 18:
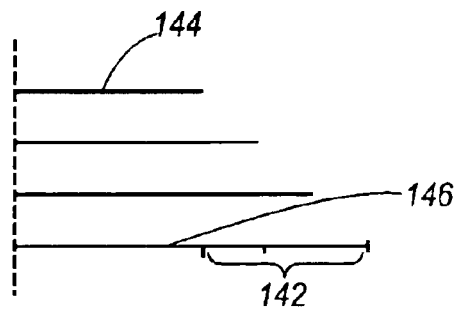
FIG. 18 is a schematic illustration showing the calculation of partial sums in a horizontal line direction.

Some consecutive partial sums (on the same horizontal line) are illustrated in FIG. 18. The partial sums have the property that, in order to calculate the sum over an intermediate segment of the line, then it is necessary merely to subtract one partial sum for another. For example, in order to calculate sum over the line segment 142, it is necessary merely to subtract the partial sum 144 from the partial sum 146.

Referring to FIG. 17, to compute the profile for lines with positive slope m, such as y=mx+c, step 148 finds the set $X_m=\{x_1, x_2, \ldots, x_n\}$ of x-values at which the discrete version of this line increment in y-value: that is, where on rounding to the nearest integer $$\text{round}(m(x+1))=\text{round}(mx)+1.$$

Figure 19:
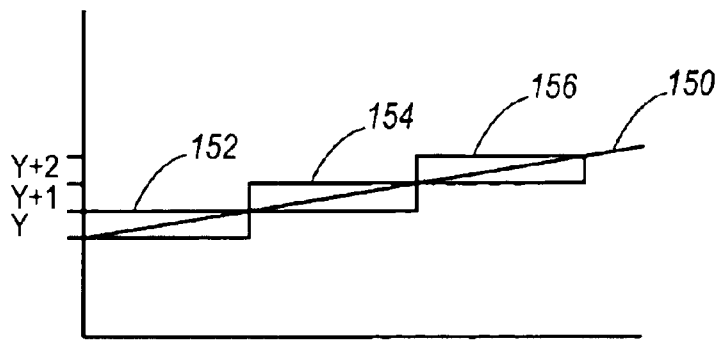
FIG. 19 is a schematic illustration showing the principle of calculating sums along inclined lines using partial horizontal sums.
Figure 21:
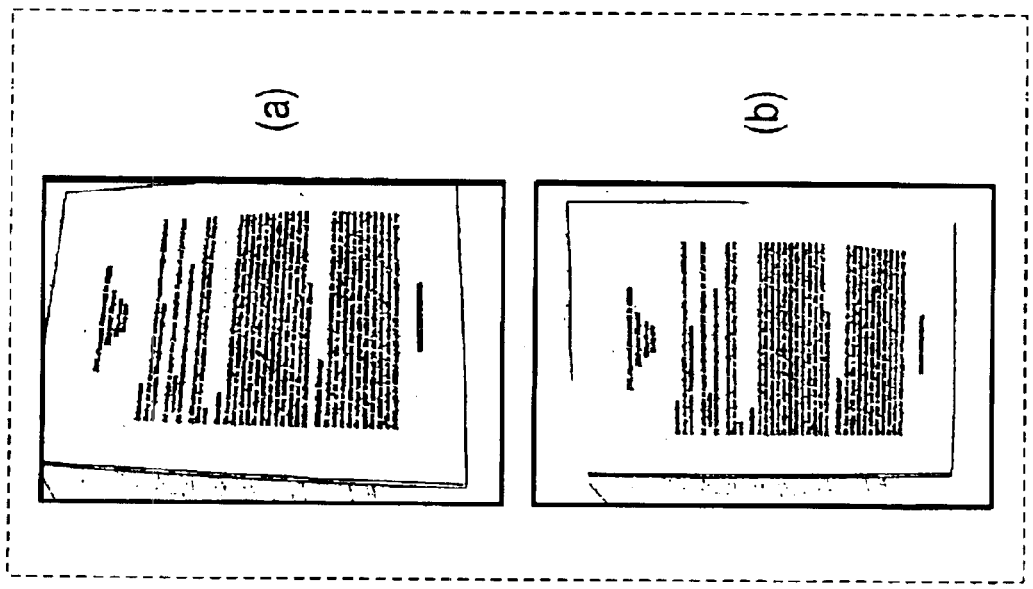
FIGS. 20–23 are schematic illustrations showing the results of perspective correction applied to sample document images.
Figure 20:
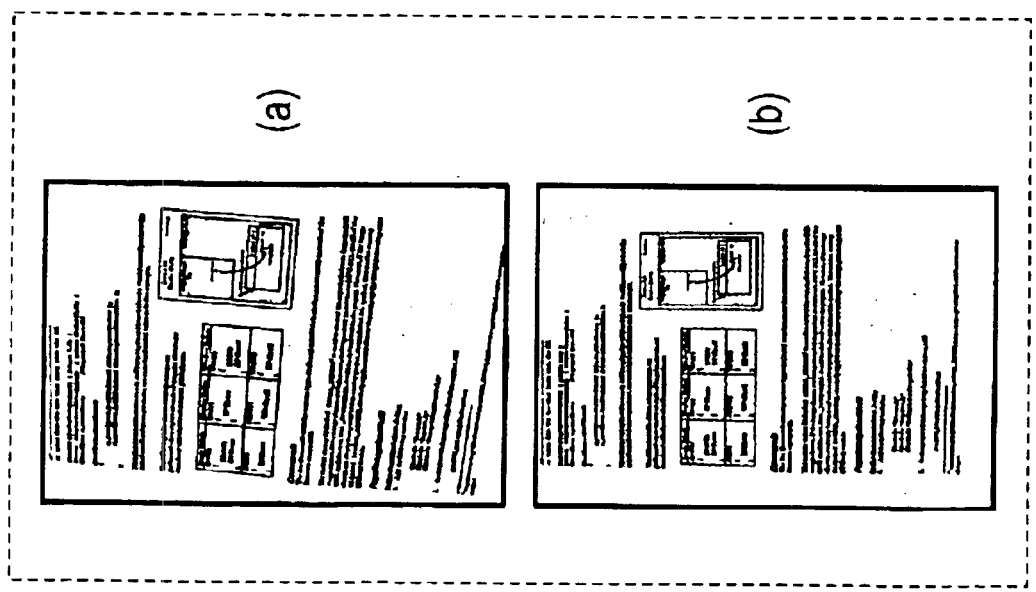
Figure 23:
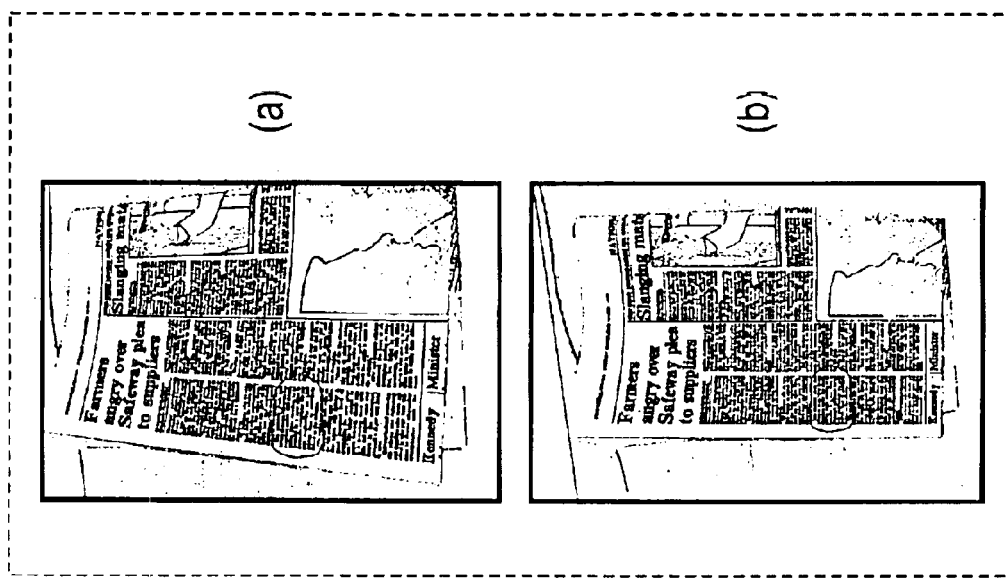
Figure 22:
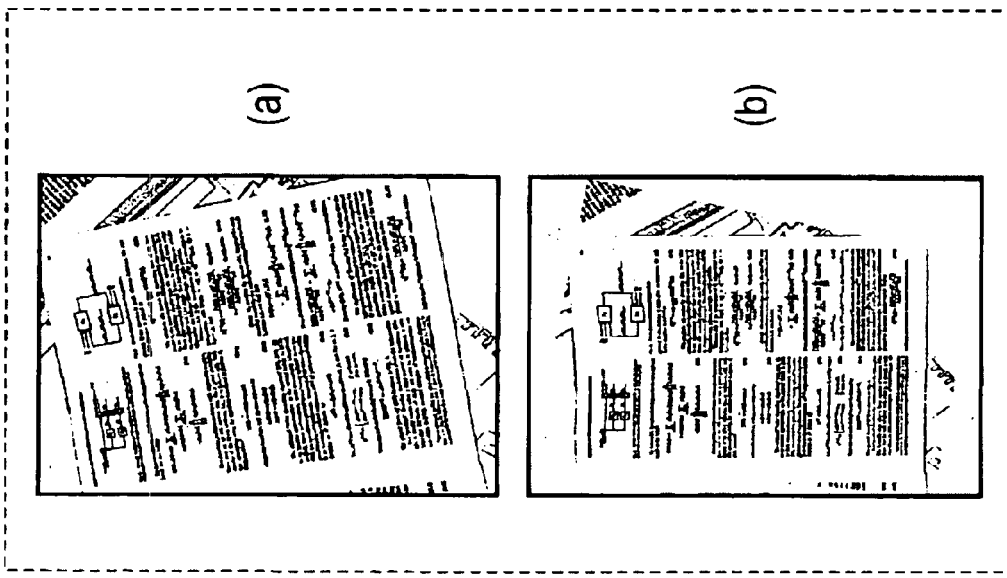

This is illustrated in FIG. 19, where the inclined line is 150 represented by horizontal segments 152, 154, and 156 of pixels on adjacent pixel lines.

At step 160 (FIG. 17), the profile is then efficiently computed by only considering those columns of the partial sum array. In particular for an image of width W, the profile (Q) is:

$$Q_m(y) = PS(W-1, y+n) + \sum_{k=1}^{n} PS(x_k, y+k-1) - PS(x_k, y+k).$$

Preferably, the sum in this expression is computed for all values of the intercept required simultaneously, to ensure efficient memory access to the partial sum array.

This equals the desired line sum for all integer y values, that is:

$$Q_m(y) = \sum_{x=0}^{W-1} I(x, \text{round }(mx+y)).$$

An analogous approach is employed for negative slopes.

At step 162, a test is performed as to whether the process needs to be repeated for another value of the slope. If so, then the process loops back to step 148 to repeat for the new slope values.

An equivalent method can be employed to compute sums along the discretization of any monotone curve segment with sufficiently small gradients. Such a curve segment is defined by a function y=round(f(x)) on a range of values of x. It is equivalently defined by a set $X_f = \{x_1, x_2, \ldots, x_n\}$ at which the curve crosses adjacent y values, the sequence of discrete y values at these points $Y_f = \{y_1, y_2, \ldots, y_n\}$, which are such that $|y_k - y_{k+1}| = 1$, and values of x and y at the start and end of the segment: $x_0, x_{n+1}, y_0, y_{n+1}$. The sum along the target curve is computed as:

$$Q_f = PS(x_{n+1}, y_{n+1}) - PS(x_0, y_0) + \sum_{k=1}^{n} PS(x_k, y_{k-1}) - PS(x_k, y_k).$$

K. Image Results

FIGS. 20–23 show, by way of example, sample images which have been successfully corrected for perspective, using the principles of the invention. In each Figure, part (a) shows the original image containing perspective distortion, and part (b) shows the perspective corrected image.

In some of the Figures, the original image contains hard edges around the periphery of the document. Such images are provided to assist the reader in seeing how the perspective is corrected in the output image. It will be appreciated that the invention does not rely on the existence of hard edges in the image. Instead, the invention uses statistical features or characteristics of the image which align with the text lines (X-lines) and the column borders (Y-lines), in order to detect X- and Y-pencils indicative of the perspective in the image.

Using the above principles on a computer using an Intel Pentium III processor running at a clock frequency of about 700 MHz with upsampled and binarized images of size 4096×3027, it has been found that the X-pencil estimation takes about 1.5 seconds, and the Y-pencil estimation takes about 2 seconds. This compares favorably with about 4 seconds to actually implement a backwards mapping to correct a full resolution binary image for perspective, once the perspective parameters are known.

The invention has been described with reference to particular embodiments. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for estimating perspective in an image, comprising:
   (a) applying at least one transform to the image to transform the image into a coordinate space representative of directional statistical characteristics in the image; and
   (b) processing the transformed image to determine at least one pencil which aligns with said directional statistical characteristics present in the image,
   wherein the transform includes differencing adjacent values.

2. A method according to claim 1, wherein the transform includes differencing adjacent values in a direction generally perpendicular to the direction of the line along which the sum is taken.

3. A method according to claim 1, wherein the transform is applied to detect statistical characteristics generally parallel to lines of text.

4. A method according to claim 1, wherein (a) and (b) are performed a first time to detect a first pencil aligned in a first direction, and wherein (a) and (b) are performed a second time to detect a second pencil aligned in a second direction different from the first direction.

5. A method according to claim 1, wherein said statistical characteristics are representative of text characteristics.

6. A method according to claim 5, wherein said statistical characteristics are representative of a direction of a text line in the image.

7. A method according to claim 5, wherein said statistical characteristics are representative of a direction of a boundary of a block of text.

8. A method according to claim 1, wherein (a) comprises:
   applying a transform to the image to transform the image into line space, in which a line in the original image is transformed into a point value in line space.

9. A method according to claim 8, wherein (b) comprises applying a second transform to further transform the transformed image from line space to a pencil space coordinate system, the pencil space coordinate system being such that a curve in line space is transformed into a point value in pencil space, indicative of a pencil aligned with characteristics in the image.

10. A method according to claim 9, wherein the pencil space coordinate system is parameterized by the rate of change of line slope, and a first slope.

11. A method according to claim 9, wherein the pencil space coordinate system is defined by polar coordinates based on a Gaussian sphere.

12. A method according to claim 9, wherein the second transform includes summing values taken along lines through values of the transformed image.

13. A method according to claim 12, wherein the second transform includes a non-linear function of values from the first transformed image.

14. A method according to claim 12, wherein the second transform includes a minimum threshold function, such that points below a minimum threshold value are ignored.

15. A method according to claim 1, wherein the line space is slope-intercept space, said transform being parameterized by slope and intercept coordinates.

16. A method according to claim 1, wherein the line space is uniform angle space, said transform being parameterized by angle and distance to an origin of the image plane.

17. A method according to claim 1, wherein the transform includes summing values taken along lines through pixels of the image.

18. A method according to claim 17, wherein the sum includes points selected as a variable scale, said scale being defined by an amount of background space detected around the point.

19. A method according to claim 18, further comprising detecting said scale of a point, by detecting the size of an area of predetermined shape adjacent to the point, said area including only background space.

20. A method according to claim 19, wherein said predetermined shape is a triangle.

21. A method according to claim 19, wherein a gray level of background space is detected with reference to a contrast value applied to the point.

22. A method according to claim 21, further comprising selecting a point only if a predetermined second area on an opposite side of said point to the first area includes a gray level indicative of foreground space in said second area.

23. A method according to claim 22, wherein said second area has a rectangular shape.

24. Apparatus for estimating perspective in an image, comprising:
- a first image transformer for applying at least one transform to the image to transform the image into a coordinate space representative of directional statistical characteristics in the image; and
- a first pencil detector for processing the transformed image to determine at least one pencil which aligns with said directional statistical characteristics present in the image,
- wherein the at least one transform includes differencing adjacent values.

25. Apparatus according to claim 24, further comprising:
- a second image transformer for applying a second transform to the image to transform the image into a coordinate space representative of directional statistical characteristics in the image in a second direction different from the first transformer; and
- a second pencil detector for processing the transformed image to determine a second pencil which aligns with said directional statistical characteristics present in the image in said second direction.

26. A method for calculating a sum of discrete pixel values along at least part of a target curve defined by a first direction and a set of stepping-values in said first direction at which a discretization of said target curve steps perpendicularly to said first direction, the method comprising:
(a) calculating a plurality of partial line sums of pixels along partial lines in a first direction parallel to a coordinate axis, each partial sum being parameterized by an intercept and a variable position away from the intercept,
(b) calculating the sum of pixel values by combining respective partial line sums representative of segments of the target curve at at least two of the said stepping values, wherein the sum $O_m(y)$ alone the target curve is defined as:

$$Q_m(y) = PS(W-1, y+n) + \sum_{k=1}^{n} PS(x_k, y+k-1) - PS(x_k, y+k),$$

where
W = width of an image in pixels;
n = number of values $X_m = \{x_1, x_2, \ldots, x_n\}$ at which the target curve crosses adjacent intercept values; and
PS(x, y) = partial sum $$PS(x, y) = \sum_{u=0}^{x} I(u, y).$$

27. A method according to claim 26, wherein the target curve is a line.

28. A method according to claim 27, further comprising repeating (b) to calculate sums at different values of slope-intercept (m,y).

* * * * *